United States Patent Office 3,381,366
Patented May 7, 1968

3,381,366
PROCESS FOR OBTAINING A
COMPOSITE ARTICLE
Joseph Winter, New Haven, Conn., assignor to Olin Mathieson Chemical Corporation, a corporation of Virginia
No Drawing. Continuation-in-part of application Ser. No. 229,262, Oct. 2, 1962. This application Oct. 1, 1965, Ser. No. 492,312
8 Claims. (Cl. 29—472.3)

ABSTRACT OF THE DISCLOSURE

This disclosure teaches a process for obtaining a composite article having a core of an aluminum base alloy clad with a dissimilar metal. The process is characterized by heating the core and rolling together the core and cladding at a speed of at least 25 feet per minute in one pass at a reduction between 35 and 80%, with the core and cladding coming together for the first time in the bite of the rolls.

---

This application is a continuation-in-part of United States patent application Ser. No. 229,262, filed Oct. 2, 1962, abandoned in favor of now abandoned Ser. No. 638,668, filed May 15, 1967.

The present invention relates to composite metal articles. More particularly, the present invention resides in composite metal articles having an aluminum core and to the processes whereby said articles are obtained.

Composite articles having an aluminum core and a dissimilar cladding are highly desirable commercially due to the fact that the beneficial characteristics of the core and cladding materials may be obtained in one composite article. In a single alloy frequently many properties cannot be greatly modified by alloying or thermal treatments, for example, such properties as modulus of elasticity, color, density, and strength in combination with high thermal or electrical conductivity. However, by forming composites apparent properties of the cladding can be generated while retaining the bulk properties of the core material. In this manner one can often obtain greatly modified and highly desirable properties over the single alloy.

For example, aluminum has the advantage of high strength-to-weight ratio, cold formability, low density and high conductivity. By forming aluminum composites one can retain these desirable properties while generating properties of the cladding, such as wear resistance, color, oxidation resistance, high surface strength, chemical resistance, tarnish resistance, fine finishing, i.e., surface quality, etc.

Various uses to which composite aluminum articles may be put are as follows: heat exchangers, electrical hardware, builders hardware, utensils, automotive components, shipping containers, ornamental purposes, and so forth.

However, the preparation of composite articles having an aluminum core presents numerous practical problems. It has been difficult to produce a satisfactory composite article having an aluminum core due to the tendency of the cladding material to form a layer of brittle, intermetallic compounds at the interface of the aluminum core and the cladding. Aluminum is particularly difficult in this regard as it is a very potent compound former with a great variety of commercial materials. This layer may form at moderate temperatures or at elevated temperatures. The brittle layer of intermetallic compounds which so forms may shatter readily on flexing of the composite material, thus clearly limiting the utility of the composite.

Furthermore, the intermetallic compounds formed will thicken rapidly at elevated temperatures due to the rapid rate of diffusion common to aluminum in combination with most engineering materials. This thick intermetallic phase may tend to improve bonding between the two components of the composite, but yields a weak link when the composite is bent or flexed. In addition, the intermetallic compounds will decrease the useable ductility of the composite.

In addition, with composite materials having an aluminum core, it is frequently difficult to obtain a well bonded composite which will withstand normally expected use.

Aluminum in air is always coated with an adherent and/or flaky oxide. This oxide will produce an interference layer which inhibits bonding. Elevated temperatures increase the thickness of this oxide layer. This oxide layer frequently tends to break up on hot rolling but still can and often does cause severe problems.

One method of forming aluminum composites in order to overcome these difficulties is to form a partial bond by cold rolling followed by subsequent diffusion anneals. This is an expensive process and the diffusion anneals tend to degrade the properties of the composite.

Another method is to eliminate oxygen completely from the composite intersurface by, for example, evacuation and welding or treatment in enclosed, inert atmospheres. Another method is to provide bonding aids of one type or another. Both of these methods are expensive and undesirable alternatives, and often unsatisfactory.

Accordingly, it is a principal object of the present invention to provide new and improved composite articles having an aluminum core.

It is a further object of the present invention to provide convenient and expeditious processes whereby said composite articles are obtained.

It is a further object of the present invention to provide processes and articles as aforesaid whereby the articles are characterized by having high strengths, excellent physical properties and a wide variety of uses.

It is a still further object of the present invention to provide processes and articles as aforesaid which overcome the numerous limitations and disadvantages attendant upon the formation of conventional composite articles having an aluminum core.

Still further objects and advantages of the present invention will appear from the ensuing discussion.

In accordance with the present invention, it has now been found that the foregoing objects and advantages may be readily obtained. The process of the present invention readily overcomes the disadvantages of the art and achieves a simple and convenient process for obtaining a highly useful composite article clad on either one side or both sides and having a core of an aluminum base alloy clad with a dissimilar metal and preferably a material selected from the group consisting of a dissimilar aluminum base alloy, a copper base alloy, a lead base alloy, a silver base alloy, a nickel base alloy, a zirconium base alloy, a zinc base alloy, a chromium base alloy, a refractory metal, a titanium base alloy, a tin base alloy and an iron base alloy. The process of the present invention comprises: (A) providing said core in plate form in a thickness less than ½ inch; (B) providing said cladding in plate form in a thickness less than ¼ inch; (C) heating said core to a temperature between 150 and 1050° F.; (D) rolling together said core and cladding at a speed of at least 25 and preferably 100 feet per minute in one pass at a reduction between 35 and 80%, with said core and cladding coming together for the first time in the bite of the rolls, said cladding contacting the roll prior to contacting said core, with the included angle between core and cladding upon entering the rolls being in excess of 5 degrees.

It is preferred to provide an angle between the cladding and core in excess of 10° upon entering the rolls in order to insure that the cladding and core will not come together earlier than in the bite of the rolls. Generally, the included angle between the core and cladding is between 5° and 22°.

It has been found that poor results are obtained if there is no included angle between core and cladding upon entering the rolls or if pre-contact between core and cladding is had prior to the bite of the rolls.

In accordance with the present invention the cladding metal contacts the roll prior to contacting the core. On the front side of the rolls (entering side) the cladding and the rolls are travelling at different linear speeds; whereas, at the exit side they are going at the same speed due to the reduction in thickness of the composite. The difference in travelling speeds between the cladding and the rolls coupled with the pre-contact between the cladding and the rolls generates a shearing strain between the cladding and the rolls and introduces shearing at the bite of the rolls to the core-clad interface. This shearing strain in addition to the normal shearing forces introduced by the rolling reduction at the core-clad interface results in turbulent flow of metal at the interface which causes more intimate bonding by increasing the interfacial linear surface of the composite by 20% or more.

It has been found that the simple process delineated above achieves a highly advantageous composite article, with the interface between the core and cladding characterized by the absence of atomic interdiffusion between base metal and cladding, with said interface being further characterized by having at least 20% greater surface contact area than planar sheets.

The composite articles of the present invention are characterized by excellent physical properties, very high bond strengths and the absence of atomic interdiffusion between base metal and cladding, which interdiffusion may result in the formation of brittle compounds. The present invention achieves these surprising advantages by means of a simple and convenient process and without the use of expensive devices such as are frequently employed in the art. In addition, the composites of the present invention are not characterized by a thick brittle layer of intermetallics such as characterize conventional composites.

In accordance with the present invention any aluminum base alloy may be employed as the core material, i.e., any alloy containing a major proportion of aluminum. Typical alloys which may be employed include but are not limited to the following: high purity aluminum, aluminum alloys 1100, 6061, 3003, 3004, etc. Typical alloying substituents include but are not limited to the following: magnesium, tin, copper, manganese, silicon, iron, chromium, zinc and so forth.

The aluminum base alloy core material should be provided in plate form having a thickness less than ½ inch, i.e., the core material may be provided in strip, sheet or the like form. The core is always the thicker component of the composite.

It is preferred, but not required, in accordance with the present invention to mechanically roughen the bonding surfaces of both the core and the cladding materials in order to assure good surface contact at the bite of the rolls. For example, the surfaces may be wire brushed or abraded, etc.

The cladding material may be any of the cladding materials indicated hereinabove. The cladding may be, for example, any of the foregoing aluminum base alloys, providing that the cladding material is dissimilar to the core material. By dissimilar aluminum alloy or dissimilar metal, the present invention contemplates, inter alia, both an aluminum alloy having different alloying ingredients or the same alloy with different physical characteristics. The optimum cladding materials are iron base alloys and copper base alloys.

In addition, any copper, lead, zirconium, tin, nickel, zinc, chromium, cobalt, silver, titanium, or iron alloy may preferably be employed as the cladding material. High purity copper, tin, lead, zirconium, nickel, zinc, chromium, refractory metal, titanium, silver or iron or base alloys of these materials may be readily employed.

Typical alloying substituents which may be employed include, but are not limited to, the following: with copper one may alloy zinc, tin, aluminum, phosphorus, iron and lead; with lead one may alloy tin, arsenic and cadmium; with tin one may alloy arsenic, cadmium, copper, lead and antimony; with nickel one may alloy chromium, iron, copper, titanium, aluminum, vanadium, tungsten, and cobalt; with zinc one may alloy copper, iron, aluminum and magnesium; with silver one may alloy copper and nickel; with iron one may alloy carbon, aluminum, titanium, zinc, lead, silicon, phosphorus, sulfur, nickel and chromium; and so forth. By refractory metals are included molybdenum, vanadium, tantalum, columbium and base alloys thereof.

The cladding material should be in plate form less than ¼ inch in thickness, i.e., the cladding and the core material should be in wrought form, for example, coils of strip, sheet, etc.

After bonding the resultant composite has a thickness less than 0.75 inch where the aluminum is clad on two sides and less than 0.52 inch where it is clad on one side. The lowest gage materials, both core and cladding, which can be conveniently worked with, is on the order of 0.001 inch.

The starting materials, both core and cladding, can be in any temper or condition, hard or soft. Surface oxides are generally no handicap to the process of the present invention. This is quite surprising and is a significant advantage of the present invention since conventional processing must remove surface oxides prior to the formation of the composite. In fact, conventional processing frequently forms composites in special atmospheres so that one cannot form surface oxides prior to the formation of the composite. These special precautions are not required in the present invention.

It is, however, highly desirable to remove dirt or adhering lubricant from the surface of the metal prior to the process of the present invention in order to assure good contact between the core and the cladding materials. Any conventional cleaning processes may be readily employed, for example, the core and cladding materials may be passed through a soap or a detergent solution in accordance with conventional procedures. Examples of such cleaning procedures include the use of commercial alkaline cleaners and solvent cleaners, such as carbon tetrachloride and trichloroethylene.

It should be noted that it is a particular advantage of the present invention that it is unnecessary to utilize bonding aids, such as a thin coating of a dissimilar metal, in order to effect the strongly adherent cladding of the present invention.

The core material is then heated to a temperature between 150 and 1050° F., and preferably to a temperature between 550 and 950° F. It is important to note that the cladding material is not heated but is left in the cold form.

The rolling step of the present invention is particularly critical. The core and cladding materials enter the rolls with the core material being provided at a temperature between 150 and 1050° F. and preferably between 550 and 950° F. The core and cladding enter the rolls at an angle so that they come together for the first time in the bite of the rolls. The materials are rolled at a high speed of at least 25 feet per minute and preferably at least 100 feet per minute, in one pass, with a reduction between 35 and 80% and preferably between 40 and 70%. Naturally, at the lower rolling speeds greater reduction is required.

It is preferred that the core and cladding enter the rolls at an angle in excess of 10° and generally at an included angle of between 5° and 22° in order to assure that the core and cladding will not come together earlier than at the bite of the rolls and in order to put as much shear as possible at the interface. The shear at the interface enables the provision of at least 20% increased surface area than between the planar materials, i.e., the interface between the core and cladding is characterized by a wave-like formation with a significant increased interfacial contact area. It is further noted that the interfacial surface between the core and cladding is characterized by the absence of interatomic diffusion between the core and cladding material. For example, when a copper alloy cladding is used, there is substantially no diffusion of copper atoms into the aluminum core.

Further in accordance with the present invention the cladding metal contacts the roll before contacting the core metal. This is true whether the core is to be clad on one side or both sides.

In general, the core material should come into the rolls substantially horizontally, particularly where the core is to be clad on both sides.

Naturally, the present invention contemplates cladding the aluminum core on both sides with dissimilar metals on each side.

A further advantage of the present invention is that subsequent to the rolling operation the composites of the present invention do not require subsequent diffusion anneals, i.e., conventional processing frequently requires diffusion anneals to secure the bond between core and cladding. The fact that the present invention does not require diffusion anneals is particularly significant since diffusion anneals might and frequently do cause blisters or the like due to the long treatment times required and co-diffusion of gases to the interface between the core and cladding.

In fact, subsequent to the rolling operation no further operations whatever are required. The composites of the present invention are provided in commercial form ready to be used for the desired application. It may naturally be desirable to perform conventional subsequent operations for particular applications. For example, short thermal treatments for stress relief or the attainment of desired properties, e.g., a short heat treating anneal or aging treatment, a rolling operation for dimensional control, additional work hardening, and so forth.

The present invention will be more readily understandable from a consideration of the following illustrative examples.

Example 1

The following is a detailed description of the general procedures used in the specific examples which follow. Except where otherwise set out in the specific examples, the general manipulative operations described here are those used in preparing and bonding the specimens of the specific examples.

A strip of base sheet metal, as for example, a strip of aluminum metal of 6 inches in length, 4 inches in width, and having a thickness of 0.125 inch, was first cleaned preparatory to joining. The cleaning steps included a wet chemical cleaning treatment such as a degreasing of the metal surface, as by immersion in a degreasing solvent such as trichlorethylene, or in an inhibited solution of an alkaline cleaning agent such as a solution of trisodium phosphate in water at 160° F. Following such a wet chemical cleaning treatment, the surface to be united was rinsed in flowing cold tap water.

After a wet chemical cleaning treatment, the surfaces to be joined may be mechanically cleaned and roughened by mechanical wire brushing, as with a cleaned stainless steel rotary wire brush, prior to being subjected to any thermal treatment.

A strip of a cladding metal, such as stainless steel, having a width approximately corresponding to those of the aluminum strip but having a length perhaps 20 percent greater than that of the base metal and a thickness of approximately one-fiftieth to one-tenth of the aluminum base, was cleaned in a manner such as that described for the aluminum above.

The cladding strip was then folded at one end to form a clip which would receive the lead edge of the aluminum strip for introduction into the nip of the rolls of a rolling mill. The cladding strip was also bent in the form of an arc resting at its ends on the base sheet but suspended along its length out of thermal and physical contact with the base, with the angle between the cladding and the core upon entering the rolls being between 10–20° and with the cladding contacting the rolls prior to contacting the core. The 20% increase in starting length of the cladding was incorporated to insure the retention of an arc during the entire rolling process.

After preparing the cladding and base metal parts in this way, the base metal only was heated at a temperature, and for a time, to impart the desirable heat to the base. Immediately after removal of the base from a heat supply means, such as a furnace, the cladding strip is clipped on to the lead end of the hot base metal strip and the assembly is immediately inserted into the nip of the rolls with the speed of the rolls being between 100 and 150 feet per minute. As the assembly is drawn rapidly between the rolls the clad metal is driven forcefully into physical and thermal contact with the heated base metal in the bite of the rolls without pre-contact.

In all cases unless indicated to the contrary, a firmly bonded composite was obtained characterized as follows: (1) as shown by microscopic examination there was no interatomic diffusion between the cladding and base metal, and (2) as shown by microscopic examination there was at least 25% greater bonding area at the interface than with the planar materials with the interface being characterized by a wave-like formation.

Example 2

A specimen of austenitic stainless steel (18–8 type) foil was clad onto a base strip of aluminum alloy 6061 as described in Example 1.

The wet chemical cleaning procedure of Example 1 was followed except that the surfaces to be confronted were cleaned by degreasing in trichlorethylene only. This was followed by a wire brush cleaning of both of the surfaces to be confronted in joining. The cladding strip was bent to have a flat lead edge lying parallel to the base sheet and an arched midsection between the ends of the cladding strip in contact with the base.

The aluminum substrate only was heated to 750° F. for twenty minutes. Immediately after withdrawal from the furnace the stainless strip was placed on the aluminum base sheet in the manner of Example 1 and the assembly was introduced by its lead edge into the nip of rapidly rotating rolls, each having a diameter of about ten inches. The rolls were set at a clearance to provide a reduction of the assembly thickness of about 50 percent in this single pass through the rolls. The assembly was bonded in passing through the nip of the rolls at about 150 feet per minute.

Two more assemblies of 6061 aluminum base metal and 18–8 type stainless cladding metal were prepared for bonding by a procedure precisely duplicating that described above except for the clearance setting between the rolls. For one of these assemblies the rolls were set to reduce the thickness by 65 percent. For the other assembly the rolls were set for a reduction of 25 percent.

The results of these separate bonding operations were as follows:

After rolling the sample to be reduced by 50 percent showed very slight edge cracking along both sides of the cladding layer. The stainless steel and aluminum were not bonded at the lead end where the flat portion of the stainless steel rested on the hot aluminum substrate, but an excellent bond was found in along the length of the specimen.

Excellent bonding was also found between the substrate and cladding of the specimen to be reduced 65 percent. It was observed, however, that the gage of the stainless steel was reduced from about .005 inch to about .002 inch. Severe transverse ruptures had developed in the body of the cladding.

The specimen to be reduced 25 percent showed the surface roughening which results from the application of bonding energy but did not result in significant bond formation.

Example 3

A composite specimen was prepared by bonding a base strip of aluminum alloy 1100 to a cladding strip of an austenitic 18-8 stainless steel (type 302) substantially as described in Example 1.

Before bonding the aluminum was about .070 inch thick and the stainless was .005 inch thick. The metal surfaces were washed with trichlorethylene and wire brushed on the surfaces to be confronted in joining. The aluminum was heated to 950° F. The strips were rapidly assembled and rapidly bonded in the manner of Example 1 with the spacing between the rolls set to produce a stainless clad aluminum composite of 0.040 inch in thickness. Rolling speed was about 150 feet per minute. Satisfactory bonding was found to have been produced over about 75 percent of the stainless steel specimen, the areas of such bonding being found to be distributed in a random pattern.

A sample 3.5 inches square was cut from a well bonded region of the composite specimen and cupped in a standard double acting deep drawing cupping press equipped to first punch a circular blank having a 3.11-inch diameter, and to then deep draw the blank to produce a cup having a 1.125-inch diameter and having side walls approximately 1.2 inches high. The cup formed successfully from the blank with the stainless steel on the outside. The base of the cup thus formed was found to have the unified structure of the bonded sheet but the stainless in the sidewall of the cup was ruptured by shearing, although the aluminum base was not ruptured. The bond between the stainless steel and aluminum was good and this was confirmed by metallographic examination.

Example 4

The procedure of Example 3 was repeated with the exception that in this case there was utilized a base metal specimen of aluminum alloy 6061 and a cladding metal strip of type 302 stainless steel.

The bond which formed extended over about 95 per cent of the composite specimen. Some edge cracking and folding were produced evidently due to misalignment of the stainless steel cladding metal on the aluminum substrate as the assembly entered the roll nip.

Example 5

The procedure of Example 3 was again repeated with the exception in the case being that the specimens were a one-inch wide hard rolled strip of zircalloy and a wider base of aluminum alloy 1100.

An extremely strong overall bond was produced between the zircalloy and aluminum strips. Significant transverse fracturing of the zircalloy occurred in the head end, i.e., the end which first underwent rolling, where greater deformation occurred in the zircalloy. At the tail end, where the zircalloy strip was impressed into the softer aluminum base metal, less deformation to the zircalloy occurred during the bonding although uniform coherent cladding occurred.

Example 6

Three base metal strips of aluminum alloy 3003 each having a thickness of 0.125 inch, and three cladding strips of stainless steel each having a thickness of .005 inch, were prepared as described in Example 2.

The aluminum specimens were each heated to 950° F. instead of to 1000° F. and, immediately after removal of the aluminum from the furnace, the respective specimens of stainless steel and aluminum were assembled and bonded at a rolling speed of 50 feet per minute. The rolls were set to reduce each of the assemblies by rolling by 50 percent as taught in Example 2.

No bonding or light sticking as by mechanical interlocking whatsoever was produced. The aluminum interface which had contacted the stainless steel in rolling had the appearance of having been lightly burnished as a result of the low speed procedure.

The duplication of the procedure of Example 2 but at the lower rolling speed and slightly lower substrate preheat temperature established the significance of rolling speed in the development of good bonding and that at lower rolling speeds greater reduction is required. For example, the procedure of the foregoing example was repeated except that the reduction was 75% and good bonding resulted.

Example 7

Two composite sheets were prepared as described in Example 2, one of type 302 stainless steel on an aluminum alloy 6061 base and the other of type 302 stainless steel on a 3003 alloy base. The rolls were set to provide a reduction of 40 percent and to provide a final gage of 0.040 for the composite.

The products formed were well bonded composite sheets.

Example 8

Two assemblies were prepared for bonding by degreasing and wire brushing the surfaces to be confronted as described in Example 1. The two cladding strips were specimens of cold rolled cupro-nickel having a thickness of 0.005 inch and the two base strip specimens were annealed aluminum alloy 1100 having a thickness of 0.107 inch. The cupro-nickel composition of the cladding strips was commercial Alloy 165 having approximately 18 percent nickel by weight and the balance copper.

A first assembly of strips was prepared for hot rolling by riveting the edges thereof together and heating the riveted assembly to 950° F. in preparation for cladding.

The second assembly was prepared for rolling by heating only the aluminum to a temperature of 950° F. This second assembly was rolled in accordance with the procedure of the present invention.

Both assemblies were reduced by rolling with the rolls set to give a reduction of approximately 50 percent.

The first assembly produced a composite product in which the cladding had substantially greater discoloration of the external surface of the cladding than that produced on the second assembly. Also the degree of adhesion of the cladding to the substrate was substantially greater and more uniform in the second assembly than in the first.

Example 9

A cladding metal strip of commercial purity titanium having a thickness of about 0.002 inch and a strip of aluminum alloy 3004 having a thickness of 0.040 inch were prepared for bonding as described in Example 1 except that the wire brushing was performed on the surface of the aluminum strip only. The aluminum strip was heated to 950° F. and bonded to the titanium strip using care to minimize thermal contact between the strips. The assembly was bonded with the clearance between the rolls set to give a reduction in thickness of the assembly of 50 percent.

A strong bond was formed between the two strips and the surface cladding displayed surface rupture in the wave form closely resembling the array of waves on the exposed surface of a large body of water over which air is moving at a relatively low velocity.

Example 10

Several specimens of aluminum having a thickness of about 0.040 were prepared for bonding as described in Example 1. Several specimens of high purity silver having a thickness of 0.001 inch were also prepared for bonding by solvent degreasing as described in Example 1.

In this example, the sample of aluminum was an aluminum base alloy containing a small percentage of tin as described in United States Patent 3,186,836.

Each of the aluminum specimens was heated in an oven maintained at a temperature of about 700° F. for a period of about 10 to 15 minutes. The aluminum was removed from the furnace and the silver was bonded thereto employing a rolling speed of about 200 feet per minute following the procedure set out in Example 2.

In bonding the clearance between the rolls was set to give a reduction of approximately 50%. The measured final gage of the composite specimen was between 0.022 and 0.024 inch. A piece of the silver cladding which was bonded to the aluminum was removed by mechanical stripping and its thickness measured. The thickness of this silver cladding was found to be approximately ½ of 1 mil.

Example 11

The procedure of Example 10 was again duplicated with the exception that in this case 0.002 inch copper was used in place of the 0.001 inch silver, the copper in this case being chemical grade foil, meaning that the copper was of approximately 0.9999% copper purity or higher.

Prior to bonding the copper specimen was cleaned by pickling in a solution of approximately 25% $HNO_3$ in water. The aluminum sample was prepared also as described in Example 10 with surface wire brushing and solvent degreasing, but was not etched. The copper sample was neither wire brushed nor solvent degreased.

As series of 5 different rolling reductions was carried out. Before rolling each of the aluminum specimens was about 2 inches wide by 5 inches long and had a thickness of 0.040 inch approximately.

A series of 5 different rolling reductions were performed with the rolls set at values to give reductions of the assemblies ranging from about 20% to about 65% with 3 intermediate values, at approximately equal percentage increments.

The sample bonded at approximately 20% reduction was very weakly bonded and exhibited edge peeling.

An optimum bonding was found at reduction values of between approximately 30 and 40%.

At reductions of approximately 50% and above transverse fracturing was observed in the thin copper cladding and the fracturing increased at the higher reduction percentage.

It was possible to reduce this copper thickness to an approximately transparent thickness where the silvery appearance of the aluminum began to become apparent through the copper despoits formed on its surface by this bonding.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for obtaining a composite article having a core selected from the group consisting of aluminum and aluminum base alloys clad with a dissimilar metal selected from the group consisting of copper and copper base alloys which comprises:
    (A) providing said core in plate form in a thickness less than ½ inch;
    (B) providing said cladding in plate form in a thickness less than ¼ inch;
    (C) heating said core to a temperature between 150 and 1050° F.;
    (D) rolling together said core and cladding at a speed of at least 25 feet per minute in one pass at a reduction between 35 and 80%, with said core and cladding coming together for the first time in the bite of the rolls, said cladding contacting the roll prior to contacting the core, with the included angle between core and cladding upon entering the rolls being in excess of 5 degrees, thereby forming an integrated composite article.

2. A process for obtaining a composite article having a core selected from the group consisting of aluminum and aluminum base alloys clad with a material selected from the group consisting of copper and copper base alloys which comprises:
    (A) providing said core in plate form in a thickness less than ½ inch;
    (B) providing said cladding in plate form in a thickness less than ¼ inch;
    (C) heating said core to a temperature between 550° F. and 1050° F.;
    (D) rolling together said core and cladding at a speed of at least 100 feet per minute in one pass at a reduction between 35 and 80%, with said core and cladding coming together for the first time in the bite of the rolls, said cladding contacting the roll prior to contacting the core, with the included angle between core and cladding upon entering the rolls being between 5 and 22 degrees, thereby forming an integrated composite article.

3. A process according to claim 2 wherein said included angle is in excess of 10°.

4. A process according to claim 2 wherein said core enters the rolls substantially horizontally.

5. A process according to claim 2 wherein said core and cladding are rolled together in one pass at a reduction between 40 and 70%.

6. A process according to claim 2 wherein the surfaces of said core and cladding to be bonded are mechanically roughened prior to rolling.

7. A process according to claim 2 wherein said core is clad on both sides.

8. A process according to claim 2 wherein both said core and cladding are cleaned prior to rolling.

References Cited

UNITED STATES PATENTS

| | | | |
|---|---|---|---|
| 2,753,623 | 7/1956 | Boessenkool | 29—497.5 |
| 2,782,498 | 2/1957 | Mushovic | 29—497.5 |
| 2,879,587 | 3/1959 | Mushovic | 29—497.5 X |
| 2,908,073 | 10/1959 | Dulin | 29—497.5 X |
| 3,095,500 | 6/1963 | Jost. | |
| 3,132,418 | 5/1964 | Fulford | 29—497.5 X |
| 3,165,829 | 1/1965 | Wardlaw | 29—498 X |
| 3,173,202 | 3/1965 | Farber | 29—497.5 X |
| 3,269,004 | 8/1966 | Smith | 29—497.5 X |

JOHN F. CAMPBELL, *Primary Examiner.*

R. F. DROPKIN, *Assistant Examiner.*